United States Patent [19]

Teramoto et al.

[11] 4,313,865

[45] Feb. 2, 1982

[54] INSTANT-SETTING ADHESIVE COMPOSITION

[75] Inventors: Toshio Teramoto, Yokohama; Noriaki Ijuin, Kawasaki; Teizo Kotani, Yokohama, all of Japan

[73] Assignee: Japan Synthetic Rubber Co., Ltd., Tokyo, Japan

[21] Appl. No.: 189,909

[22] Filed: Sep. 23, 1980

[30] Foreign Application Priority Data

Sep. 28, 1979 [JP] Japan .............................. 54-125070

[51] Int. Cl.$^3$ .............................................. C08K 5/10
[52] U.S. Cl. ......................... 260/31.4 R; 260/32.8 N; 260/33.2 R; 260/33.4 R; 526/278; 526/286; 526/312
[58] Field of Search ............... 526/278, 286, 303, 312; 260/31.4 R, 32.8 N, 33.2 R, 33.4 R

[56] References Cited

U.S. PATENT DOCUMENTS 3,316,227 4/1967 Gerber .............................. 526/75

Primary Examiner—Joseph L. Schofer
Assistant Examiner—Bernard Lipman
Attorney, Agent, or Firm—Oblon, Fisher, Spivak, McClelland & Maier

[57] ABSTRACT

An instant-setting adhesive composition comprising a 2-cyanoacrylate and at least one 1,1-disubstituted diene, the amount of said 1,1-disubstituted diene exceeding 50% by weight based on the total weight of both components. This composition is useful in the same fields as those where conventional 2-cyanoacrylate adhesives have been used, and is excellent in impact resistance, peel resistance, heat resistance and water resistance.

19 Claims, 4 Drawing Figures i-PrccB/CA= 7/3
x 20,000 i-PrccB/CA=3/7
20,000

INSTANT-SETTING ADHESIVE COMPOSITION

This invention relates to instant-setting adhesive compositions which are improved in impact resistance, peel resistance, heat resistance and water resistance.

2-Cyanoacrylate adhesives have heretofore been known as instant-setting adhesives. These adhesives are utilized in various fields, because they are single-component liquid adhesives of the nonsolvent type having the specific property that they polymerize instantaneously at room temperature in the presence of a minute amount of moisture existing on the surface of adherends or in the air to bond metals, plastics, rubbers, and the like.

The 2-cyanoacrylate adhesives, however, are unsatisfactory in impact resistance, peel resistance, flexibility, heat resistance or water resistance, and hence, are limited in their use range. For instance, because of their low impact strength, they cannot be used, except for tentative bonding, in metal-to-metal bonding where the resulting bonds are required to have a high impact strength. A problem which arises in bonding rubbers to themselves with the 2-cyanoacrylate adhesive is that owing to lack of flexibility and peel resistance the adhesive layer is unable to follow closely the deformation of rubber, resulting in delamination.

Further, the maximum temperature at which the bond strength of conventional 2-cyanoacrylate adhesives is practically acceptable is 80° C. and this does not meet the heat resistance required especially for electrical and mechanical parts.

To overcome the above defects, a large number of studies and proposals have been made in the past. For instance, for the purpose of improving the impact resistance, incorporation of various additives into a 2-cyanoacrylate has been proposed as described in Japanese Patent Application Kokai (Laid-Open) Nos. 146,445/77 and 35,743/78. These attempts, however, have not yet succeeded in imparting sufficient performance characteristics to the resulting adhesives. For the improvement in heat resistance, there have been known those methods which employ crosslinking monomers as disclosed in Japanese Patent Application Kokai (Laid-Open) Nos. 22,432/74, 22,433/74 and 94,722/74 or use hydroxyacrylates as disclosed in Japanese Patent Application Kokai (Laid-Open) No. 110,635/78. Although these methods result in an appreciable improvement of the adhesive performance, they are not yet successful in improving at the same time the impact resistance to a satisfactory degree.

The present inventors have conducted extensive studies to solve the above problems and, as a result, have found that it is possible to obtain an adhesive composition, in which the impact resistance, peel resistance, heat resistance and water resistance are markedly improved and the instant-setting property characteristic of the 2-cyanoacrylates remain unimpaired, by the addition of a specified 1,1-disubstituted diene to a 2-cyanoacrylate.

This invention provides an instant-setting adhesive composition comprising a 2-cyanoacrylate and at least one 1,1-disubstituted diene represented by the following general formula, the amount of said 1,1-disubstituted diene being more than 50% by weight based on the total amount of said two components:

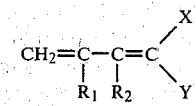

wherein $R_1$ is hydrogen atom, an alkyl group having 1 to 5 carbon atoms, an aryl group, an aralkyl group or a halogen atom, $R_2$ is a hydrogen atom or an alkyl group having 1 to 5 carbon atoms, and X and Y, which may be the same or different, are selected from the group consisting of cyano group, carboxylate group, ethylsulfone group, phenylsulfone group, formyl group, acetyl group, benzoyl group, diethylphosphonyl group, amide group and phenyl group.

The 2-cyanoacrylates used in this invention include all of the common esters of 2-cyanoacrylic acid. The specific examples of such esters are methyl, ethyl, n-propyl, isopropyl, n-butyl, isobutyl, tertbutyl, amyl, n-hexyl, cyclohexyl, heptyl, n-octyl, 2-ethylhexyl, dodecyl, allyl, propargyl, benzyl, phenyl, 2-methoxyethyl, 2-ethoxyethyl, 2-chloroethyl, hexafluoroisopropyl, trifluoroethyl, and 2-cyanoethyl 2-cyanoacrylates. These may be used alone or in admixture.

The 1,1-disubstituted dienes used in this invention are represented by the general formula:

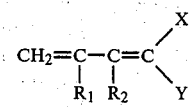

wherein $R_1$, $R_2$, X and Y are as defined above. It is preferably that $R_1$ be a hydrogen atom or an alkyl group of 1 or 2 carbon atoms, $R_2$ be a hydrogen atom, X be a cyano group, and Y be a carboxylate group, ethylsulfone group, benzoyl group, diethylphosphonyl group, amide group or phenyl group. Specific examples are 1-cyano-1-carbomethoxybutadiene-1,3, 1-cyano-1-carbethoxybutadiene-1,3, 1-cyano-1-carbo-n-propoxybutadiene-1,3, 1-cyano-1-carboisopropoxybutadiene-1,3, 1-cyano-1-carbon-butoxybutadiene-1,3, 1-cyano-1-carboisobutoxybutadiene-1,3, 1-cyano-1-carbo-tert-butoxybutadiene-1,3, 1,1-dicyanobutadiene-1,3, 1,1-dicarbomethoxybutadiene-1,3, 1,1-dicarbethoxybutadiene-1,3, 1-cyano-1-ethylsulfonylbutadiene-1,3, 1-acetyl-1-phenylbutadiene-1,3, 1-cyano-1-acetamidobutadiene-1,3, 1-formyl-1-phenylbutadiene-1,3, 1-cyano-1-phenylbutadiene-1,3, 1-cyano-1-benzenesulfonylbutadiene-1,3, 1-cyano-1-diethylphosphonobutadiene-1,3, 1-benzoyl-1-cyanobutadiene-1,3, 1-cyano-1-carbethoxy-3-(n-amyl)butadiene-1,3, 1-cyano-1-carbethoxy-2-methylbutadiene-1,3, 1-cyano-1-carbethoxy-3-phenylbutadiene-1,3, 1,1-dicarbethoxy-3-methylbutadiene-1,3, and 1-cyano-1-carbethoxy-3-chlorobutadiene-1,3. These are used alone or in admixture. Preferable 1,1-disubstituted dienes are 1-cyano-1-carbomethoxybutadiene-1,3, 1-cyano-1-carbethoxybutadiene-1,3, 1-cyano-1-carbo-n-propoxybutadiene-1,3, 1-cyano-1-carbo-n-propoxybutadiene-1,3, 1-cyano-1-carboisopropoxybutadiene-1,3, 1-cyano-1-carbo-n-butoxybutadiene-1,3, 1-cyano-1-carboisobutoxybutadiene-1,3, 1-cyano-1-carbo-tert-butoxybutadiene-1,3, 1-cyano-1-ethylsulfonylbutadiene-1,3, 1-cyano-1-acetamidobutadiene-1,3, 1-cyano-1-phenylbutadiene-1,3, 1-cyano-1-diethylphosphonobutadiene-1,3, 1-benzoyl-1-cyanobutadiene-1,3, 1-cyano-1-carbethoxy-2-methylbutadiene-1,3, and mixtures thereof. These compounds can be synthesized, as described in U.S. Pat. No. 3,316,227, by the reaction between an α,β-unsaturated carbonyl compound (e.g. acrolein) and an active methylene compound (e.g. ethyl cyanoacetate) in the presence of a metal salt as catalyst.

The amount of 1,1-disubstituted diene added is more than 50%, preferably at least 60%, most preferably 65 to 85%, by weight based on the total amount of the 2-cyanoacrylate and the 1,1-disubstituted diene. The addition of 1,1-disubstituted diene in an amount of not more than 50% by weight results in low impact resistance in some cases, an insufficient increase in water resistance or in heat resistance, and a marked low peel strength, as compared with the case of addition of more than 50% by weight of 1,1-disubstituted diene. When the amount of 1,1-disubstituted diene added exceeds 50% by weight based on the total amount of the 2-cyanoacrylate and the 1,1-disubstituted diene, as it were a borderline, a rapid increase in peel strength is observed, though the reason therefor has not been clarified. In order to examine such a phenomenon more closely, a mixture of ethyl 2-cyanoacrylate and 1-cyano-1-carboisopropoxybutadiene-1,3 (i-PrccB) as a selected example of the 1,1-disubstituted diene, was allowed to polymerize autogenously into a hardened product and the latter was observed under an electron microscope. As is seen from FIGS. 1 and 2 of the accompanying drawings, there was observed the formation of polymer presumably not by random polymerization but by unexpected block copolymerization. By comparison of FIG. 1, wherein the weight ratio of diene to 2-cyanoacrylate is 70:30, with FIG. 2, wherein said ratio is 30:70, the occurrence of phase transition between the diene phase dyed black with $OsO_4$ and the white, undyed 2-cyanoacrylate phate is evident. From the observation it is presumable that the critical concentration for the phase transition is just over 50% by weight of 1,1-disubstituted diene based on the total amount of the 2-cyanoacrylate and the 1,1-disubstituted diene and that when the diene phase becomes the matrix, the adhesive layer is placed under the control of the diene phase, resulting in a rapid increase in peel strength. As a consequence, the peel strength becomes maximum at a diene concentration of just over 50% by weight and thence decreases with the further increase in diene concentration. The upper limit of the preferable diene concentration is 95% by weight.

The instant-setting adhesive composition of this invention is further improved in peel strength and tensile shear strength by the addition of a certain type of lactone compound. Preferable lactone compounds are monocyclic, bicyclic or condensed ring lactones having a 4- to 7-membered lactone ring. These are saturated or unsaturated compounds having preferably 3 to 20, most preferably 3 to 10, carbon atoms and may have substituents such as alkyl groups, aryl groups, aralkyl groups, cycloalkyl groups or carboxylate groups. Specific examples thereof include β-propiolactone, β-pivalolactone, γ-butyrolactone, 3-carbethoxy-γ-butyrolactone, 5-ethyl-γ-butyrolactone, phthalide, δ-valerolactone, coumarin, dihydrocoumarin, ε-caprolactone, heptodilactone, and dimethylheptodilactone. These lactones are added alone or in admixture to the mixture of 2-cyanoacrylate and 1,1-disubstituted diene. The amount of lactone added is preferably 0.1 to 30 parts by weight, most preferably 0.5 to 10 parts by weight per 100 parts by weight of the mixture of 2-cyanoacrylate and 1,1-disubstituted diene. If the amount exceeds 30 parts by weight, the tensile shear strength will sometimes be decreased.

The conventional 2-cyanoacrylate adhesives are generally incorporated with stabilizers, thickeners, plasticizers, coloring agents, perfumes, hardening promoters and the like. These may be added also to the instant-setting adhesive composition of this invention. Stabilizers such as sulfur dioxide, sulfonic acids, sultones, lactone-boron trifluoride, hydroquinone, hydroquinone monomethyl ether, catechol, pyrogallol and the like may be added in a proportion of 1 to 1,000 ppm. It is also possible to incorporate, as a thickener, such polymers as methyl methacrylate polymer, 2-cyanoacrylate polymer, acryl rubber and polymers of those 1,1-disubstituted dienes which are used in the instant-setting adhesive composition of this invention, in a proportion of 50 parts by weight per 100 parts by weight of the total amount of both the 2-cyanoacrylate and 1,1-disubstituted diene. If necessary, plasticizers such as dioctyl phthalate, sebacates, phosphoric esters, and the like may be added to further improve the flexibility.

Although the instant-setting adhesive composition of this invention exhibits sufficiently good heat resistance in the absence of a radical generating agent, the latter may be added in an amount of up to 10% by weight for the purpose of promoting the formation of a three-dimensional structure of the hardened polymer in the adhesive layer, leading to a further improvement in heat resistance. Effective radical generating agents are chiefly organic peroxides, typical examples of which are benzoyl peroxide, dibutyl peroxide, dicumyl peroxide, tert-butylcumyl peroxide, 1,1-bis(tert-butylperoxy)-cyclohexane, and 2,2-bis(tert-butylperoxy)butane. Other compounds such as azo compounds, ammonium persulfate, and sulfur may also be used.

The hardening promoters for use in the instant-setting adhesive composition of this invention are alcohols, alcohol ethers, alcohol esters or crown ether compounds.

Specific examples of the alcohols, alcohol ethers, and alcohol esters are as follows:

Monohydric alcohols: methyl alcohol, ethyl alcohol, n-propyl alcohol, isopropyl alcohol, n-butyl alcohol, isobutyl alcohol, tert-butyl alcohol, n-amyl alcohol, etc.

Dihydric alcohols: ethylene glycol, propylene glycol, tetramethylene glycol, pentamethylene glycol, hexamethylene glycol, heptamethylene glycol, octamethylene glycol, decamethylene glycol, polybutadienediol, chloropropylene glycol, 3-methylpentanediol, 2,2-diethylpropanediol, 2-ethyl-1,4-butanediol, diethylene glycol, triethylene glycol, polyethylene glycol, dipropylene glycol, polypropylene glycol, etc.

Polyhydric alcohols: glycerol, trimethylolmethane, trimethylolethane, trimethylolpropane, 1,2,6-hexanetriol, etc.

Alcohol ethers: propylene glycol methyl ether, dipropylene glycol methyl ether, tripropylene glycol methyl ether, ethylene glycol ethyl ether, ethylene glycol n-butyl ether, diethylene glycol methyl ether, diethylene glycol ethyl ether, diethylene glycol n-butyl ether, ethylene glycol phenyl ether, polyoxyethylene lauryl ether, polyoxyethylene nonylphenyl ether, etc.

Alcohol esters: polyethylene glycol monolaurate, polyethylene glycol monostearate, glycerol monolaurate, glycerol monostearate, sorbitan monolaurate, polyoxyethylene sorbitan monolaurate, etc.

The above alcohols, alcohol ethers and alcohol esters may be added alone or in admixture to the mixture of 2-cyanoacrylate and 1,1-disubstituted diene. The amount of the alcohol, alcohol ether or alcohol ester added is preferably 0.001 to 5 parts by weight, most preferably 0.05 to 2 parts by weight, 100 parts by weight of the total amount of the 2-cyanoacrylate and the 1,1-disubstituted diene. If the amount is less than 0.001 part by weight, the promoting effect on the hardening will be insignificant, while if it exceeds 5 parts by weight, the storage stability of the adhesive will sometimes become worse.

The nomenclature of crown ethers is based on the form of their structural formulas. The most typical cyclic hexamer of ethylene oxide is called 18-crown-6. The numeral 18 denotes the number of ring members and the numeral 6 denotes the number of oxygen atoms. The oxygen atoms of a crown ether are arranged inside the ring and take hold of metal ions or organic ions in the molecule by coordinate bonds, whereby the compound has the specific properties.

Crown ether analogs in which the oxygen atoms of crown ethers are partially or wholly replaced with nitrogen, sulfur, phosphorus or boron atoms, such as, for example, dithia-15-crown may also be used. Also usable are those analogs in which the ethylene segments of crown ethers are partially replaced with benzo, cyclohexyl, decalyl, naphtho, methylbenzo, butylbenzo, vinylbenzo, butylcyclohexyl, oxocyclohexane, methylene, trimethylene, tetramethylene, and pentamethylene radicals and those analogs in which a part of the hydrogen atoms of the ethylene segment is substituted by methyl, ethyl, propyl, butyl, acetyl, phenyl, oxygen, or fluoro.

Typical examples of the crown ether compounds used as hardening promoters include the following:
 (1) 18-Crown-6
 (2) Dithia-15-crown
 (3) 15-Crown-5
 (4) 18-Crown-5
 (5) Dibenzo-18-crown-6
 (6) Dibenzo-24-crown-8
 (7) Dicyclohexyl-18-crown-6
 (8) 1,2-Vinylbenzo-15-crown-5

The above crown ether compounds are added alone or in admixture to the mixture of 2-cyanoacrylate and 1,1-disubstituted diene. The amount of the compound added is preferably 0.001 to 5 parts by weight, most preferably 0.05 to 2 parts by weight per 100 parts by weight of the total of the 2-cyanoacrylate and the 1,1-disubstituted diene. If the amount is less than 0.001 part by weight, the promoting effect on the hardening will be small, while if it exceeds 5% by weight, the storage stability of the adhesive will sometimes be impaired.

The conditions for the application and subsequent hardening of the instant-setting adhesive composition of this invention are similar to those for the conventional cyanoacrylate adhesives. As a general rule, the instant-setting adhesive composition of this invention is coated on one side of one of the adherend members. The coated side is brought into contact with uncoated side of the other member to allow the adhesive to spread into a thin layer and both members are firmly held together by the finger or by means of a suitable jig for several seconds to several minutes to set the adhesive. If necessary, both uncoated adherend members are held together in a bonding position and the instant-setting adhesive composition of this invention is allowed to penetrate into the interface to be bonded. For the purpose of further promotion of the hardening, it is effective to rub the bonding surfaces of the uncoated adherends with a cloth or the like moistened with a weak-anionic polymerization initiator such as an aqueous solution of sodium hydroxide or a weak amine base and then to apply the adhesive composition followed by the same bonding procedure as described above. It is also effective to preheat the uncoated adherend materials at about 40° to 60° C. The former procedure of pretreating the adherend surfaces is particularly effective in bonding porous materials such as wood and cardboards. Some of the instant-setting adhesive compositions of this invention may crystallize at low temperatures. In such a case, the adhesive composition should be heated before use to melt away the crystals or should be applied to the adherend materials which have been kept at a temperature at which the crystals will melt upon application of the adhesive composition.

Upon hardening, the instant-setting adhesive composition of this invention seems to be converted into a mixture of a copolymer of a 2-cyanoacrylate with a 1,1-disubstituted diene and homopolymers of the respective components; the diene unit in the polymerizate seems to afford the crosslinking site, thus contributing to the improvement in heat resistance of the adhesive bond.

The instant-setting adhesive composition of this invention is able to bond firmly metals, glass, plastics, rubbers and other materials within a period of several seconds to several minutes similarly to the conventional 2-cyanoacrylate adhesives. The bond which is formed manifests a peel strength as high as 5 to 20 times that of the bond formed by the conventional 2-cyanoacrylate adhesives. As compared with the conventional 2-cyanoacrylate adhesives, the present adhesive composition provides a bond which is markedly improved in heat resistance and chemical resistance. Accordingly, the instant-setting adhesive composition of this invention is able to meet the requirements for the structural instant-setting adhesive.

The invention is illustrated below with reference to Examples and accompanying drawings. The Examples, however, are merely illustrative and not limitative. In the drawings, FIG. 1 is an electron micrograph of the hardened adhesive composition of this invention;

Figure 1:
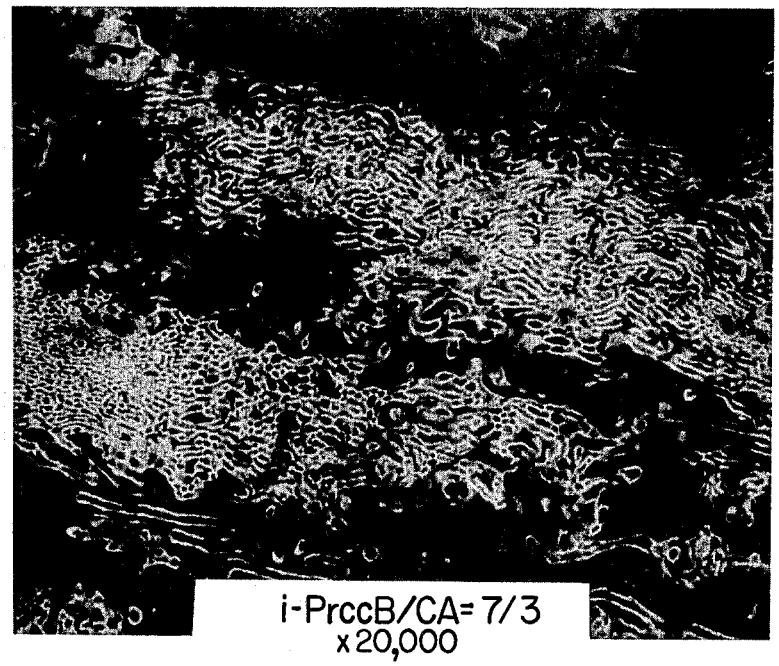
Figure 2:
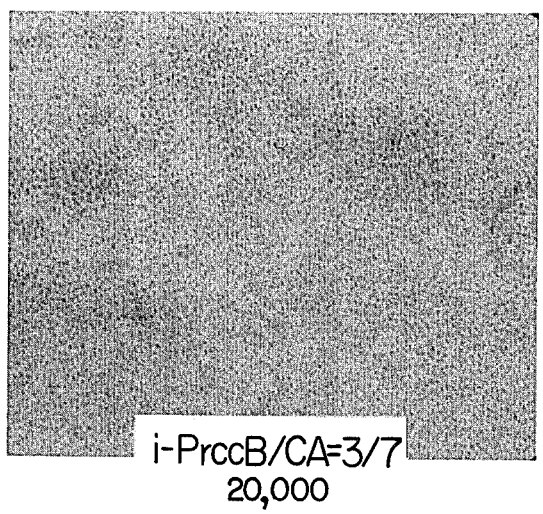
FIG. 2 is an electron micrograph of the hardened product of an adhesive composition not covered by the present invention.

The 1,1-disubstituted diene was synthesized in the following manner:

Zinc chloride (87.7 g) was heated with stirring in 351 ml of dioxane. To the mixture, after having been cooled to room temperature, were added 114 ml of ethyl cyanoacetate and 98 ml of acrolein. The mixture was allowed to react at room temperature for 3 hours. The reaction mixture was mixed with about 800 ml of petroleum ether and washed three times with one-liter portions of cold dilute hydrochloric acid. The organic layer was separated and dried. On removal of the solvent, there was obtained 116 g (73% yield) of 1-cyano-1-carbethoxybutadiene-1,3. The product was purified by adding thereto small amounts of p-toluenesulfonic acid and p-tert-butylcatechol and distilling the mixture under reduced pressure (boiling point 66.5° C./2 mmHg).

In the same manner as above, 1-cyano-1-carbomethoxybutadiene-1,3, 1,1-dicarbethoxybutadiene-1,3, 1-cyano-1-carboisopropoxybutadiene-1,3, 1-cyano-1-carboisobutoxybutadiene-1,3 and 1,1-dicyanobutadiene-1,3 were synthesized.

EXAMPLES 1 TO 11 AND COMPARATIVE EXAMPLES 1 TO 10

Adhesive compositions were prepared by mixing commercial ethyl 2-cyanoacrylate with 1,1-disubstituted dienes in varying proportions as shown in Table 1. Each one drop of the dienes was placed on the test piece prepared as specified in JIS or ASTM (described later). Another test piece was laid over the test piece carrying a drop of the adhesive and both pieces were pressed together under an applied force of 2 kg f. After standing for 24 hours, each test specimen was subjected to bonding tests. The results obtained were as shown in Table 1.

Peel strength of adhesive bond: The peel strength was determined in accordance with JIS K 6854. The test piece was aluminum sheet, 0.1 mm in thickness, and the T-peel test was performed.

Impact strength of adhesive bond: The impact strength was determined in accordance with ASTM D 950-78. The test piece material was aluminum.

Heat resistance of adhesive bond: The test pieces were bonded together in the same manner as in the tensile test and cured at room temperature for 24 hours to prepare test specimens. After being allowed to stand in a Geer oven at 150° C. for 3 hours, the test specimen was tested for the bond strength on a Schopper tensile tester provided with a thermostat maintained at 150° C., at a tensile rate of 50 mm/min.

As is seen from the test results shown in Table 1, as compared with the conventional 2-cyanoacrylate adhesive, the instant-setting adhesive composition of this invention is greatly improved in heat resistance and peel strength. It is also seen that if the amount of the 1,1-disubstituted diene is below 50% by weight, the increase in heat resistance is small and the peel strength is decreased.

EXAMPLE 12

Various materials were bonded with the same adhesive composition as used in Example 1. The results of tests for the setting time and the tensile strength of adhesive bond were as shown in Table 2.

The test for the setting time was performed in accordance with JIS K 6861 and the test for the tensile strength in accordance with JIS K 6861 and JIS K 6849.

The aptitude of the instant-setting adhesive composition of this invention for instantaneous bonding is evident from Table 2.

EXAMPLES 13 AND 14 AND COMPARATIVE EXAMPLES 11 AND 12

Figure 3:
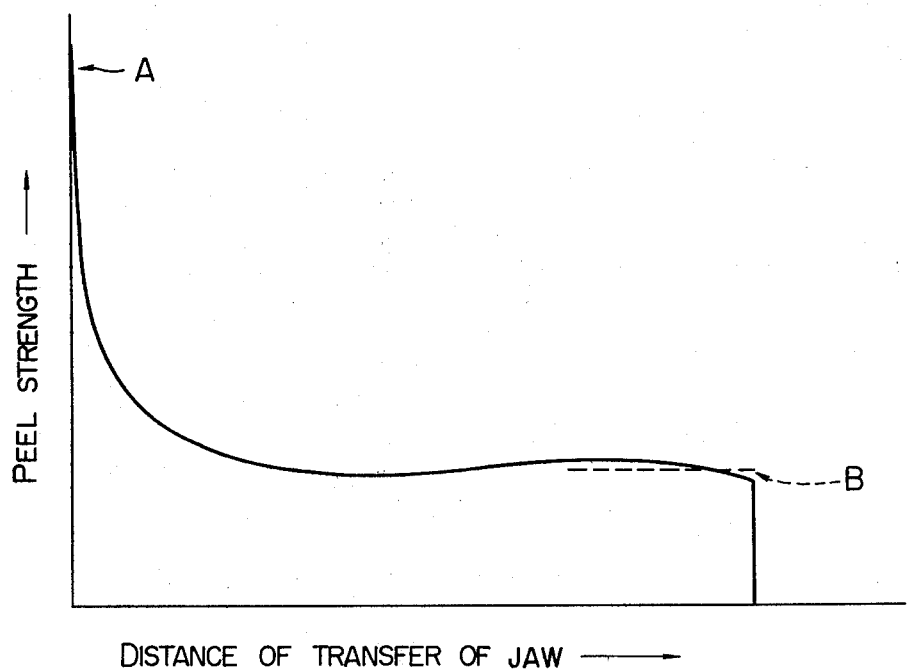
FIG. 3 represents a peel strength curve of the present adhesive composition.

The peel strength of the adhesive bond was determined in accordance with JIS K 6854 on the adhesive bonds formed by use of the adhesive compositions shown in Table 3. The test piece was a steel plate, 1.6 mm in thickness, and the T-peel test was conducted. The peel strength-curve of an adhesive composition was as shown in FIG. 3. The peel strength was determined from the load value at B of the curve. In FIG. 3, the abnormal peak load at A seemed to be due to the cleavage force when the test specimen was subjected to tension. The ordinate corresponds to the peel strength.

Figure 4:
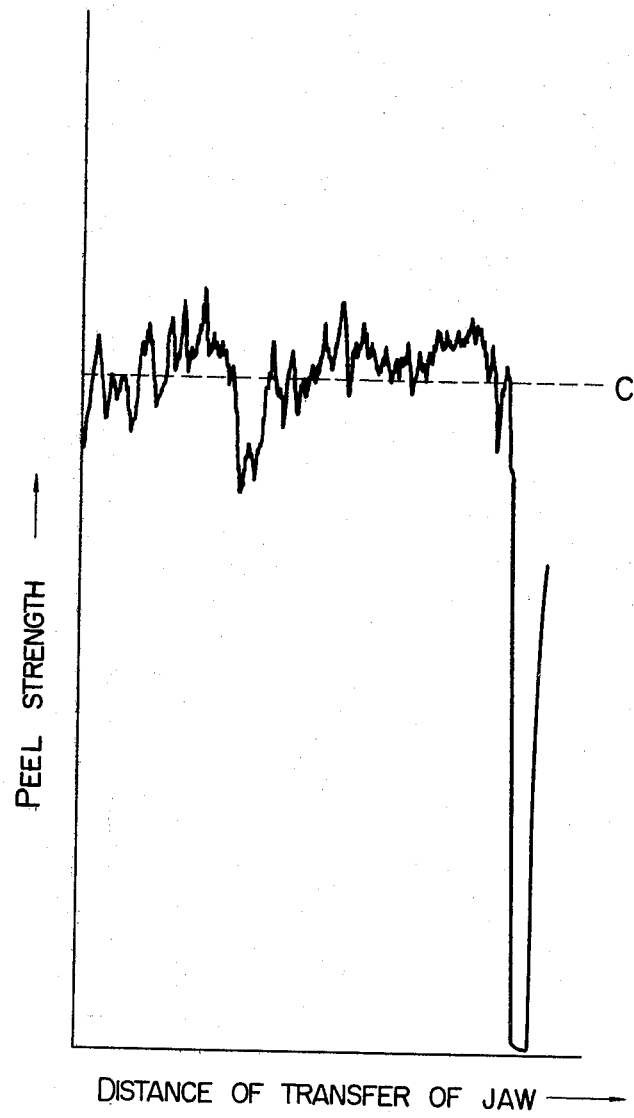
FIG. 4 represents a peel strength curve of aluminum plates adhered to each other with the present adhesive composition.

When a thin aluminum sheet, 0.1 mm in thickness, was used as test piece material, a peel strength-curve shown in FIG. 4 was obtained. The peel strength was calculated by averaging all load values at crests and troughs (C in FIG. 4). When the adherend material was sufficiently thick, a peel strength-curve as shown in FIG. 3 was obtained. In this case, the peel-strength was determined from the load value at B. The test results were as shown in Table 3.

EXAMPLES 15 AND 16 AND COMPARATIVE EXAMPLES 13 AND 14

Test specimens prepared in a manner similar to that in Example 1 by using adhesive compositions shown in Table 4 were immersed in water at 25° C. for 7 days. Upon removal of each test specimen from the water, the tensile shear strength of the adhesive bond was immediately determined in accordance with JIS K 6850. The test results were as shown in Table 4. It is seen from Table 4 that the instant-setting adhesive composition of this invention is excellent in water resistance.

EXAMPLES 17 TO 24

By using the adhesive compositions shown in Table 5, various bonding tests were performed similarly to Examples 1 to 11. The setting time for the steel-to-steel bond was determined similarly to Example 12. The test results were as shown in Table 5. The effects of various additives on the performance characteristics of the instant-setting adhesive compositions of this invention are apparent from Table 5.

TABLE 1

|  | 1,1-Disubstituted diene | (1,1-disubstituted diene/ethyl 2-cyanoacrylate weight ratio) | Peel strength (kg/cm) | Impact strength (kg . cm/in$^2$) | Heat resistance (kg/cm$^2$) |
| --- | --- | --- | --- | --- | --- |
| Example 1 | 1-Cyano-1-carbomethoxy-butadiene-1,3 | (80/20) | 2.05 | 150≦ | 103 |
| Example 2 | 1-Cyano-1-carbomethoxy-butadiene-1,3 | (70/30) | 2.00 | " | 96 |
| Example 3 | 1-Cyano-1-carbomethoxy-butadiene-1,3 | (55/45) | 1.93 | " | 84 |
| Comparative Example 1 | 1-Cyano-1-carbomethoxy-butadiene-1,3 | (40/60) | 0.71 | " | 74 |
| Comparative Example 2 | 1-Cyano-1-carbomethoxy-butadiene-1,3 | (20/80) | 0.20 | " | 68 |
| Comparative Example 3 | 1-Cyano-1-carbomethoxy-butadiene-1,3 | (100/0) | 0.10 | " | 108 |

TABLE 1-continued

| | 1,1-Disubstituted diene (1,1-disubstituted diene/ethyl 2-cyanoacrylate weight ratio) | | Peel strength (kg/cm) | Impact strength (kg·cm/in²) | Heat resistance (kg/cm²) |
|---|---|---|---|---|---|
| Example 4 | 1-Cyano-1-carboiso-propoxybutadiene-1,3 | (90/10) | 1.24 | " | 98 |
| Example 5 | 1-Cyano-1-carboiso-propoxybutadiene-1,3 | (70/30) | 1.46 | " | 95 |
| Example 6 | 1-Cyano-1-carboiso-propoxybutadiene-1,3 | (55/45) | 1.02 | " | 91 |
| Comparative Example 4 | 1-Cyano-1-carboiso-propoxybutadiene-1,3 | (30/70) | 0.28 | " | 80 |
| Comparative Example 5 | 1-Cyano-1-carboiso-propoxybutadiene-1,3 | (10/90) | 0.22 | " | 34 |
| Comparative Example 6 | 1-Cyano-1-carboiso-propoxybutadiene-1,3 | (100/0) | 0.46 | " | 105 |
| Example 7 | 1-Cyano-1-carbethoxy-butadiene-1,3 | (80/20) | 2.31 | 150≦ | 92 |
| Example 8 | 1-Cyano-1-carbethoxy-butadiene-1,3 | (55/45) | 1.80 | " | 85 |
| Example 9 | 1,1-Dicarbethoxy-butadiene-1,3 | (60/40) | 2.32 | " | 86 |
| Comparative Example 7 | 1,1-Dicyanobutadiene-1,3 | (40/60) | 1.32 | 150≦ | 86 |
| Comparative Example 8 | 1-Cyano-1-carbethoxy-butadiene-1,3 | (20/80) | 0.73 | " | 76 |
| Comparative Example 9 | 1-Cyano-1-carbethoxy-butadiene-1,3 | (5/95) | 0.22 | 46 | 21 |
| Comparative Example 10 | Ethyl 2-cyanoacrylate alone | (0/100) | 0.14 | 42 | 10 |
| Example 10 | 1-Cyano-1-carbomethoxy-butadiene-1,3/ 1-Cyano-1-carboisopropoxy-butadiene-1,3/ Ethyl 2-cyanoacrylate | (30/40/30) | 2.51 | 150≦ | 168 |
| Comparative Example 11 | 1-Cyano-1-carbomethoxy-butadiene-1,3/ 1-Cyano-1-carboethoxy-butadiene-1,3/ ethyl 2-cyanoacrylate | (40/40/20) | 2.60 | " | 160 |

TABLE 2

| Adherend material | Setting time (second) | Tensile strength (kg/cm²) |
|---|---|---|
| Same material | | |
| Natural rubber | 3–5 | *33 |
| Nitrile rubber | 3–5 | *42 |
| Rigid polyvinyl chloride | 5–10 | *200 |
| Polymethyl methacrylate | 30–90 | *150 |
| Bakelite | 20–40 | *100 |
| Polystyrol | 40–60 | *40 |
| ABS resin | 15–30 | *100 |
| Steel | 20–40 | 160 |
| Copper | 20–30 | 87 |
| Stainless steel | 20–40 | 140 |
| Aluminum | 30–60 | 142 |
| Brass | 20–30 | 150 |
| Glass | 3–5 | *— |
| Wood | 60–120 | *120 |
| Different material | | |
| ABS resin/aluminum | 15–40 | *70 |
| PVC/stainless steel | 5–20 | *140 |
| Nitrile rubber/copper | 3–20 | *38 |
| Aluminum/stainless steel | 30–60 | 155 |
| Steel/glass | 3–20 | *— |

*Cohesive failure in adherend material.

TABLE 3

| | 1,1-Disubstituted diene (1,1-disubstituted diene/ethyl 2-cyanoacrylate weight ratio) | Peel strength (kg/25 mm) |
|---|---|---|
| Example 13 | 1-Cyano-1-carbomethoxybutadiene-1,3/ethyl 2-cyanoacrylate (70/30) | 19.5 |
| Example 14 | 1-Cyano-1-carbomethoxybutadiene-1,3/ethyl 2-cyanoacrylate (55/45) | 18.1 |
| Comparative Example 11 | 1-Cyano-1-carbomethoxybutadiene-1,3/ethyl 2-cyanoacrylate (40/60) | 5.0 |
| Comparative Example 12 | Ethyl 2-cyanoacrylate alone (0/100) | 0.1≧ |

TABLE 4

| | 1,1-Disubstituted Diene (1,1-disubstituted diene/ethyl 2-cyanoacrylate weight ratio) | Tensile shear strength (kg/cm²) | Tensile shear strength after immersion in water (kg/cm²) |
|---|---|---|---|
| Example 15 | 1-Cyano-1-carboisopropoxybutadiene- | 249 | 220 |

TABLE 4-continued

| | 1,1-Disubstituted Diene (1,1-disubstituted diene/ethyl 2-cyanoacrylate weight ratio) | Tensile shear strength (kg/cm$^2$) | Tensile shear strength after immersion in water (kg/cm$^2$) |
|---|---|---|---|
| Example 16 | 1,3/ethyl 2-cyanoacrylate (70/30) 1-Cyano-1-carbomethoxybutadiene-1,3/ethyl 2-cyanoacrylate (70/30) | 240 | 210 |
| Comparative Example 13 | 1-Cyano-1-carbomethoxybutadiene-1,3/ethyl 2-cyanoacrylate (40/60) | 187 | 62 |
| Comparative Example 14 | Ethyl 2-cyanoacrylate alone (0/100) | 132 | 24 |

TABLE 5

| Example No. | 1,1-Disubstituted diene (1,1-disubstituted diene/ethyl 2-cyanoacrylate weight ratio) | Additive (added amount, % by weight) | Tensile shear strength (kg/cm$^2$) | Peel strength (kg/cm) | Impact strength (kg · cm/in$^2$) | Setting time (second) |
|---|---|---|---|---|---|---|
| 17 | 1-Cyano-1-carbethoxy-butadiene-1,3/ethyl 2-cyanoacrylate (70/30) | Methyl alcohol (0.1) | 178 | 2.48 | 150≦ | 3–5 |
| 18 | 1-Cyano-1-carbethoxy-butadiene-1,3/ethyl 2-cyanoacrylate | Ethylene glycol (0.1) | 180 | 2.50 | " | 8–10 |
| 19 | 1-Cyano-carbethoxy-butadiene-1,3/ethyl (70/30) 2-cyanoacrylate | 18-Crown-6-ether (0.1) | 165 | 2.50 | " | 5–10 |
| 20 | 1-Cyano-1-carbethoxy butadiene-1,3/ethyl (70/30) 2-cyanoacrylate | 15-Crown-5-ether (0.1) | 198 | 2.52 | " | 3–5 |
| 21 | 1-Cyano-1-carbethoxy-2-cyanoacrylate | 15-Crown-5- | 180 | 2.38 | " | 5–10 |
| 22 | 1-Cyano-1-carbethoxy-butadiene-1,3/ethyl (70/30) 2-cyanoacrylate | γ-Butyrolactone 5 | 270 | 2.60 | " | 20–40 |
| 24 | 1-cyano-carbethoxy 2-cyanoacrylate | — | 180 | 2.20 | " | 20–40 |

What is claimed is:

1. An instant-setting adhesive composition comprising a 2-cyanoacrylate and at least one 1,1-disubstituted diene represented by the following general formula (A), the amount of said 1,1-disubstituted diene being more than 50% by weight but not more than 90% by weight based on the total amount of both components:

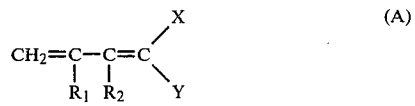

wherein R$_1$ is a hydrogen atom, an alkyl group having 1 to 5 carbon atoms, an aryl group, an aralkyl group or a halogen atom, R$_2$ is a hydrogen atom or an alkyl group having 1 to 5 carbon atoms, and X and Y, which may be the same or different, are selected from the group consisting of cyano group, carboxylate group, ethylsulfone group, phenylsulfone group, formyl group, acetyl group, benzoyl group, diethylphosphonyl group, amido group and phenyl group.

2. An instant-setting adhesive composition according to claim 1, wherein in the general formula (A), R$_1$ is a hydrogen atom or an alkyl group having 1 or 2 carbon atoms, R$_2$ is a hydrogen atom, X is a cyano group, and Y is a carboxylate group, an ethylsulfone group, a benzoyl group, a diethylphosphonyl group, an amide group, or a phenyl group.

3. An instant-setting adhesive composition according to claim 1, wherein the 1,1-disubstituted diene represented by the general formula (A) is one or more compound selected from the group consisting of 1-cyano-1-carbomethoxybutadiene-1,3, 1-cyano-1-carbethoxybutadiene-1,3, 1-cyano-1-carbo-n-propoxybutadiene-1,3, 1-cyano-1-carboisopropoxybutadiene-1,3, 1-cyano-1-carbo-n-butoxybutadiene-1,3, 1-cyano-1-carboisobutoxybutadiene-1,3, 1-cyano-1-carbo-tert-butoxybutadiene-1,3, 1,1-dicyanobutadiene-1,3, 1,1-dicarbomethoxybutadiene-1,3, 1,1-dicarbethoxybutadiene-1,3, 1-cyano-1-ethylsulfonylbutadiene-1,3, 1-acetyl-1-phenylbutadiene-1,3, 1-cyano-1-acetamidobutadiene-1,3, 1-formyl-1-phenylbutadiene-1,3, 1-cyano-1-phenylbutadiene-1,3, 1-cyano-1-benzenesulfonylbutadiene-1,3, 1-cyano-1-diethylphosphonobutadiene-1,3, 1-benzoyl-1-cyanobutadiene1,3, 1-cyano-1-carbethoxy-3-(n-amyl)-butadiene-1,3, 1-cyano-1-carbethoxy-2-methylbutadiene-1,3, 1-cyano-1-carbethoxy-3-phenylbutadiene-1,3, 1,1-dicarbethoxy-3-methylbutadiene-1,3, and 1-cyano-1-carbethoxy-3-chlorobutadiene-1,3.

4. An instant-setting adhesive composition according to claim 2, wherein the 1,1-disubstituted diene represented by the general formula (A) in one or more compound selected from the group consisting of 1-cyano-1-carbomethoxybutadiene-1,3, 1-cyano-1-carbethoxybutadiene-1,3, 1-cyano-1-carbo-n-propoxybutadiene-1,3, 1-cyano-1-carboisopropoxybutadiene-1,3, 1-cyano-1-carbo-n-butoxybutadiene-1,3, 1-cyano-1-carboisobutoxybutadiene-1,3, 1-cyano-1-carbo-tert-butoxybutadiene-1,3, 1-cyano-1-ethylsulfonylbutadiene-1,3, 1-cyano-1-acetamidobutadiene-1,3, 1-cyano-1-phenylbutadiene-1,3, 1-cyano-1-diethylphosphonobutadiene-1,3, 1-benzoyl-1-cyanobutadiene-1,3, and 1-cyano-1-carbethoxy-2-methylbutadiene-1,3.

5. An instant-setting adhesive composition according to claims 1, 2, 3 or 4, wherein the 2-cyanoacrylate is one or more compound selected from the group consisting of methyl 2-cyanoacrylate, ethyl 2-cyanoacrylate, n-propyl 2-cyanoacrylate, isopropyl 2-cyanoacrylate, n-butyl 2-cyanoacrylate, isobutyl 2-cyanoacrylate, tert-butyl 2-cyanoacrylate, amyl 2-cyanoacrylate, n-hexyl 2-cyanoacrylate, cyclohexyl 2-cyanoacrylate, heptyl 2-cyanoacrylate, n-octyl 2-cyanoacrylate, 2-ethylhexyl 2-cyanoacrylate, dodecyl 2-cyanoacrylate, allyl 2-cyanoacrylate, propargyl 2-cyanoacrylate, benzyl 2-cyanoacrylate, phenyl 2-cyanoacrylate, 2-methoxyethyl 2-cyanoacrylate, 2-ethoxyethyl 2-cyanoacrylate, 2-chloroethyl 2-cyanoacrylate, hexafluoroisopropyl 2-cyanoacrylate, trifluoroethyl 2-cyanoacrylate, and 2-cyanoethyl 2-cyanoacrylate.

6. An instant-setting adhesive composition according to claims 1, 2, 3 or 4, wherein the amount of one or more 1,1-disubstituted dienes is 60 to 90% by weight per 40 to 10% by weight of the 2-cyanoacrylate.

7. An instant-setting adhesive composition according to claims 1, 2, 3 or 4, wherein the amount of one or more 1,1-disubstituted dienes is 65 to 85% by weight per 35 to 15% by weight of the 2-cyanoacrylate.

8. An instant-setting adhesive composition according to claims 1, 2, 3 or 4, which further contains one or more members selected from the group consisting of lactone compounds, alcohols, alcohol ethers, alcohol esters, and crown ether compounds.

9. An instant-setting adhesive composition according to claim 8, wherein the lactone compound is one or more members selected from the group consisting of β-propiolactone, β-pivalolactone, γ-butyrolactone, 3-carbethoxy-γ-butyrolactone, 5-ethyl-γ-butyrolactone, phthalide, δ-valerolactone, coumarin, dihydrocoumarin, ε-caprolactone, heptodilactone, and dimethylheptodilactone.

10. An instant-setting adhesive composition according to claim 8, wherein the alcohol is one or more members selected from the group consisting of methyl alcohol, ethyl alcohol, n-propyl alcohol, isopropyl alcohol, n-butyl alcohol, isobutyl alcohol, tert-butyl alcohol, n-amyl alcohol, ethylene glycol, propylene glycol, tetramethylene glycol, pentamethylene glycol, hexamethylene glycol, heptamethylene glycol, octamethylene glycol, decamethylene glycol, polybutadienediol, chloropropylene glycol, 3-methylpentanediol, 2,2-diethylpropanediol, 2-ethyl-1,4-butanediol, diethylene glycol, triethylane glycol, polyethylene glycol, dipropylene glycol, polypropylene glycol, glycerol, trimethylolmethane, trimethylolethane, trimethylolpropane, and 1,2,6-hexanetriol.

11. An instant-setting adhesive composition according to claim 8, wherein the alcohol ether is one or more members selected from the group consisting of propylene glycol methyl ether, dipropylene glycol methyl ether, tripropylene glycol methyl ether, ethylene glycol ethyl ether, ethylene glycol n-butyl ether, diethylene glycol methyl ether, diethylene glycol ethyl ether, diethylene glycol n-butyl ether, ethylene glycol phenyl ether, polyoxyethylene lauryl ether, and polyoxyethylene nonylphenyl ether.

12. An instant-setting adhesive composition according to claim 8, wherein the alcohol ester is one or more members selected from the group consisting of polyethylene glycol monolaurate, polyethylene glycol monostearate, glycerol monolaurate, glycerol monostearate, sorbitan monolaurate, and polyoxyethylene sorbitan monolaurate.

13. An instant-setting adhesive composition according to claim 8, wherein the crown ether compound is one or more members selected from the group consisting of 18-crown-6, dithia-15-crown, 15-crown-5, 18-crown-5, dibenzo-18-crown-6, dibenzo-24-crown-8, dicyclohexyl-18-crown-6, and 1,2-vinylbenzo-15-crown-5.

14. An instant-setting adhesive composition according to claim 8, wherein the amount of the lactone compound is 0.1 to 30 parts by weight per 100 parts by weight of the total amount of the 2-cyanoacrylate and the 1,1-disubstituted diene.

15. An instant-setting adhesive composition according to claim 8, wherein the amount of the lactone compound is 0.5 to 10 parts by weight per 100 parts by weight of the total amount of the 2-cyanoacrylate and the 1,1-disubstituted diene.

16. An instant-setting adhesive composition according to claim 8, wherein the amount of at least one compound selected from the group consisting of alcohols, alcohol ethers and alcohol esters is 0.001 to 5 parts by weight per 100 parts by weight of the total amount of the 2-cyanoacrylate and the 1,1-disubstituted diene.

17. An instant-setting adhesive composition according to claim 8, wherein the amount of at least one compound selected from the group consisting of alcohols, alcohol ethers and alcohol esters is 0.05 to 2 parts by weight per 100 parts by weight of the total amount of the 2-cyanoacrylate and the 1,1-disubstituted diene.

18. An instant-setting adhesive composition according to claim 8, wherein the amount of the crown ether compound is 0.001 to 5 parts by weight per 100 parts by weight of the total amount of the 2-cyanoacrylate ester and the 1,1-disubstituted diene.

19. An instant-setting adhesive composition according to claim 8 wherein the amount of the crown ether compound is 0.05 to 2 part by weight per 100 parts by weight of the total amount of the 2-cyanoacrylate and the 1,1-disubstituted diene.

* * * * *